United States Patent
Tozier et al.

(10) Patent No.: US 12,479,160 B2
(45) Date of Patent: Nov. 25, 2025

(54) 3D PRINTER BED

(71) Applicant: Textron Aviation Inc., Wichita, KS (US)

(72) Inventors: Ron Tozier, Andover, KS (US); Kyra Rubinstein, Wichita, KS (US); Ryan Binter, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 94 days.

(21) Appl. No.: 18/583,375

(22) Filed: Feb. 21, 2024

(65) Prior Publication Data

US 2024/0286352 A1 Aug. 29, 2024

Related U.S. Application Data

(60) Provisional application No. 63/487,195, filed on Feb. 27, 2023.

(51) Int. Cl.
*B29C 64/00* (2017.01)
*B29C 64/118* (2017.01)
(Continued)

(52) U.S. Cl.
CPC .......... *B29C 64/245* (2017.08); *B29C 64/118* (2017.08); *B29C 64/209* (2017.08); *B29C 64/232* (2017.08); *B29C 64/241* (2017.08); *B29C 64/25* (2017.08); *B29C 64/336* (2017.08); *B29C 64/35* (2017.08); *B33Y 10/00* (2014.12); *B33Y 30/00* (2014.12); *B33Y 40/00* (2014.12); *B29C 64/236* (2017.08)

(58) Field of Classification Search
CPC .............................. B29C 64/245; B33Y 10/00
See application file for complete search history.

(56) References Cited

U.S. PATENT DOCUMENTS 9,399,322 B2 * 7/2016 Mulliken .............. B29C 64/386
9,539,762 B2 1/2017 Durand et al.
(Continued)

FOREIGN PATENT DOCUMENTS

CN 105903961 A * 8/2016 .............. B22F 10/38
CN 105120182 B * 1/2018
(Continued)

OTHER PUBLICATIONS

International Search Report and Written Opinion issued Jun. 3, 2024 in International Application No. PCT/US2024/017325, 10 pages.
(Continued)

*Primary Examiner* — Nicholas R Krasnow
(74) *Attorney, Agent, or Firm* — Avek IP, LLC

(57) ABSTRACT

Disclosed is a heated printer bed mounted to a kinematic coupling system that permits thermal expansion of both the bed and a support truss. One kinematic couple couples the bed to the support truss and a second kinematic couple couples the support truss to a frame of the printer. Both kinematic couples ensure that a common geometric center along each kinematic couple is maintained despite thermal expansion of the printer bed and the support truss occurring at different rates. The kinematic coupling system mitigates deformations to 3D-printed items from the effects of thermal expansion.

5 Claims, 13 Drawing Sheets

(51) Int. Cl.

| | | |
|---|---|---|
| *B29C 64/209* | (2017.01) | |
| *B29C 64/232* | (2017.01) | |
| *B29C 64/241* | (2017.01) | |
| *B29C 64/245* | (2017.01) | |
| *B29C 64/25* | (2017.01) | |
| *B29C 64/336* | (2017.01) | |
| *B29C 64/35* | (2017.01) | |
| *B33Y 10/00* | (2015.01) | |
| *B33Y 30/00* | (2015.01) | |
| *B33Y 40/00* | (2020.01) | |
| *B29C 64/236* | (2017.01) | |

(56) References Cited

U.S. PATENT DOCUMENTS

| | | | |
|---|---|---|---|
| 9,694,545 B2 | 7/2017 | Skubic et al. | |
| 10,414,094 B2 | 9/2019 | Skubic et al. | |
| 10,703,044 B2* | 7/2020 | Herman | B29C 64/295 |
| 10,751,951 B1 | 8/2020 | Nguyen et al. | |
| 11,117,310 B2 | 9/2021 | Brusilovski et al. | |
| 2013/0236706 A1* | 9/2013 | Xu | B29C 35/0805 |
| | | | 264/129 |
| 2015/0158254 A1 | 6/2015 | Chang | |
| 2015/0190967 A1 | 7/2015 | Stava et al. | |
| 2017/0326773 A1 | 11/2017 | Gibson | |
| 2018/0149039 A1* | 5/2018 | Loeffel | B33Y 10/00 |
| 2018/0169942 A1* | 6/2018 | Jessen | B29C 64/255 |
| 2018/0236532 A1* | 8/2018 | Forsmark | B22F 5/10 |
| 2019/0351617 A1 | 11/2019 | Heston et al. | |
| 2021/0162654 A1* | 6/2021 | Lamoncha | B29C 64/393 |
| 2022/0048114 A1* | 2/2022 | Günster | B33Y 30/00 |
| 2022/0234294 A1 | 7/2022 | Akasaka | |
| 2022/0281175 A1* | 9/2022 | Shi | B22F 10/31 |
| 2023/0031400 A1 | 2/2023 | Parrott | |
| 2023/0056383 A1* | 2/2023 | Albert | B22F 10/80 |
| 2024/0208153 A1* | 6/2024 | Mills | B29C 64/232 |

FOREIGN PATENT DOCUMENTS

| | | | | |
|---|---|---|---|---|
| CN | 113477943 A | * | 10/2021 | B33Y 50/02 |
| CN | 109789487 B | * | 3/2022 | B29C 64/153 |
| CN | 114302802 A | * | 4/2022 | B33Y 50/00 |
| CN | 117921137 A | * | 4/2024 | B33Y 50/00 |
| CN | 119500980 A | * | 2/2025 | B33Y 80/00 |
| CN | 120197503 A | * | 6/2025 | |
| DE | 102015103377 A1 | | 5/2016 | |
| DE | 202018105230 U1 | * | 12/2019 | B33Y 30/00 |
| DE | 102018122296 A1 | * | 3/2020 | B29C 64/165 |
| DE | 102019125187 A1 | * | 3/2021 | B33Y 80/00 |
| DE | 102021111966 A1 | * | 11/2022 | B29C 64/118 |
| DE | 102024117431 A1 | * | 12/2024 | C04B 35/622 |
| EP | 3632591 B1 | * | 8/2022 | B22F 10/385 |
| KR | 20160069361 A | * | 6/2016 | B29C 67/0003 |
| KR | 20190019532 A | * | 2/2019 | B33Y 40/00 |
| SE | 1500245 A1 | | 11/2016 | |
| WO | 2011146244 A2 | | 11/2011 | |
| WO | WO-2015112998 A1 | * | 7/2015 | B29C 64/232 |
| WO | 2018081554 A1 | | 5/2018 | |
| WO | 2022150340 A1 | | 7/2022 | |

OTHER PUBLICATIONS

International Search Report and Written Opinion issued May 21, 2024 in International Application No. PCT/US2024/017329, 12 pages.

International Search Report and Written Opinion issued May 27, 2024 in International Application No. PCT/US2024/017330, 15 pages.

* cited by examiner

3D PRINTER BED

CROSS-REFERENCE TO RELATED APPLICATIONS

This application claims the benefit of U.S. Provisional Application No. 63/487,195 entitled "3D Printer Design" and filed on Feb. 27, 2023, which is herein incorporated by reference in its entirety.

BACKGROUND

1. Field

Embodiments of the invention relate generally to 3D printers, and more specifically to a doubly kinematic coupled print bed.

2. Related Art

U.S. Pat. No. 9,539,762 to Durand et al. discloses a 3D printer which incorporates a kinematic coupling between a printer bed and a structure below it used to keep the printer bed level. U.S. Pat. No. 11,117,310 to Brusilovski et al. discloses an additive manufacturing system with multiple printer heads that may print using a broad range of materials. U.S. Pat. No. 9,694,545 to Skubic et al. discloses embodiments of a 'purge station' which removes residual material buildup from a printer nozzle in an additive manufacturing system. U.S. Pat. No. 10,414,094 to Skubic et al. discloses a method for adjusting a height of the purge station as disclosed in U.S. Pat. No. 9,694,545 to Skubic et al.

SUMMARY

In aspects of certain embodiments, a printer bed for a 3D printer includes: a heated printer bed; a support truss configured to support the printer bed; a frame configured to support the support truss; a first kinematic couple configured to control thermal expansion of the printer bed; and a second kinematic couple configured to control thermal expansion of the support truss, wherein a first centroid of the first kinematic couple is aligned with a second centroid of the second kinematic couple such that a common geometric center is maintained despite thermal expansion of the printer bed occurring at a different rate than thermal expansion of the support truss.

In other embodiments, a thermal expansion compensation system comprises a set of kinematic couples including at least a first kinematic couple and a second kinematic couple, wherein the kinematic couples permit thermal expansion of components while said components remain positionally static relative to a centroid of their respective kinematic couples; and a frame including a plurality of mounting points for a plurality of kinematic coupling units.

Other embodiments may comprise a 3D printing system which includes: a frame including a plurality of linear actuators configured to move in a common vertical direction; a support truss with supports that may be disposed on the linear actuators of the frame, such that support truss is moved along with the linear actuators and is coupled to the frame via a kinematic couple; and a heated printer bed that may adhere deposited material to the bed, wherein the printer bed is coupled to the support truss via a kinematic couple that maintains a common centroid while the printer bed undergoes thermal expansion.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 12A:
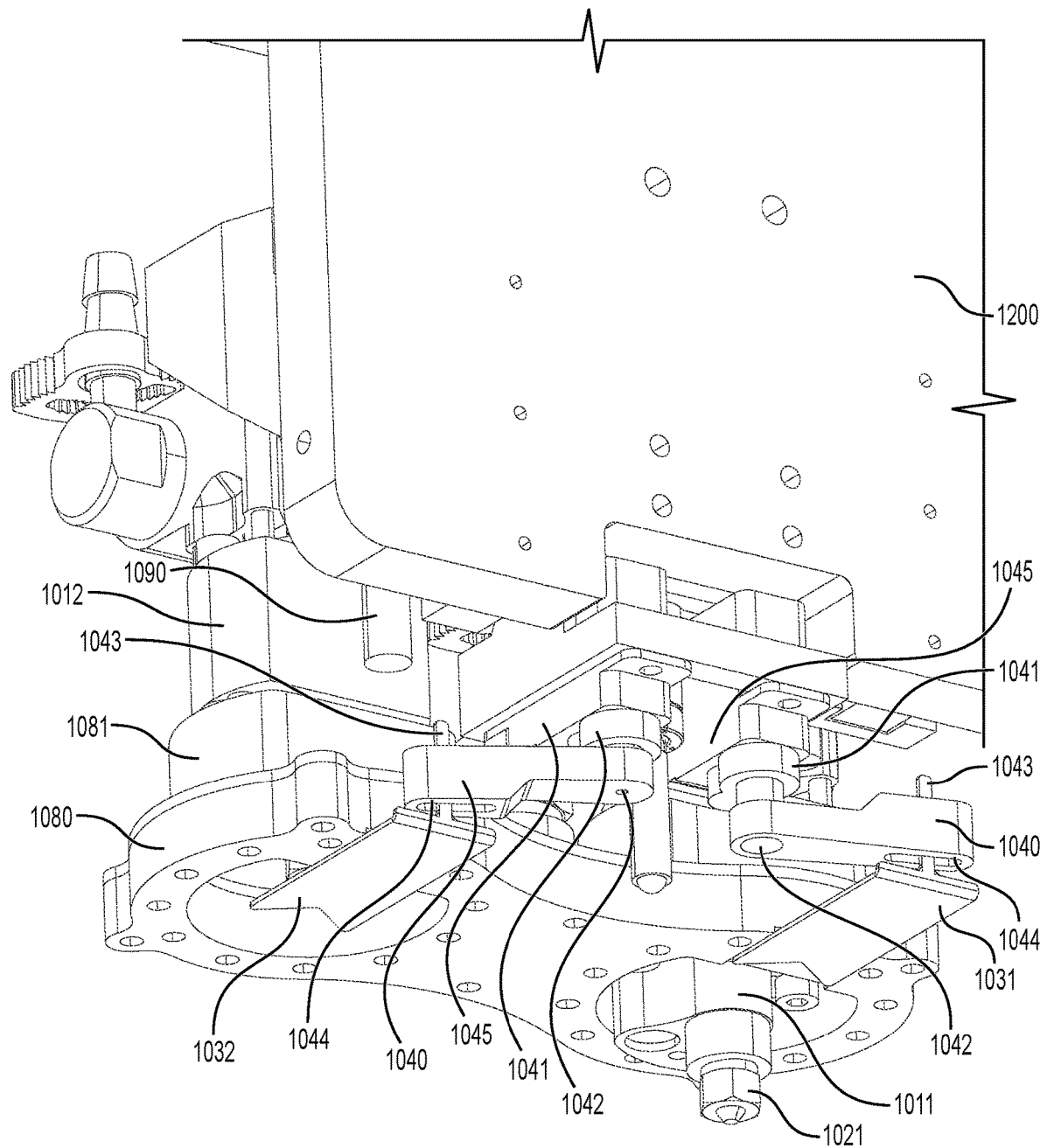

FIG. 12A provides a back view of the filament heads; and

Figure 10:
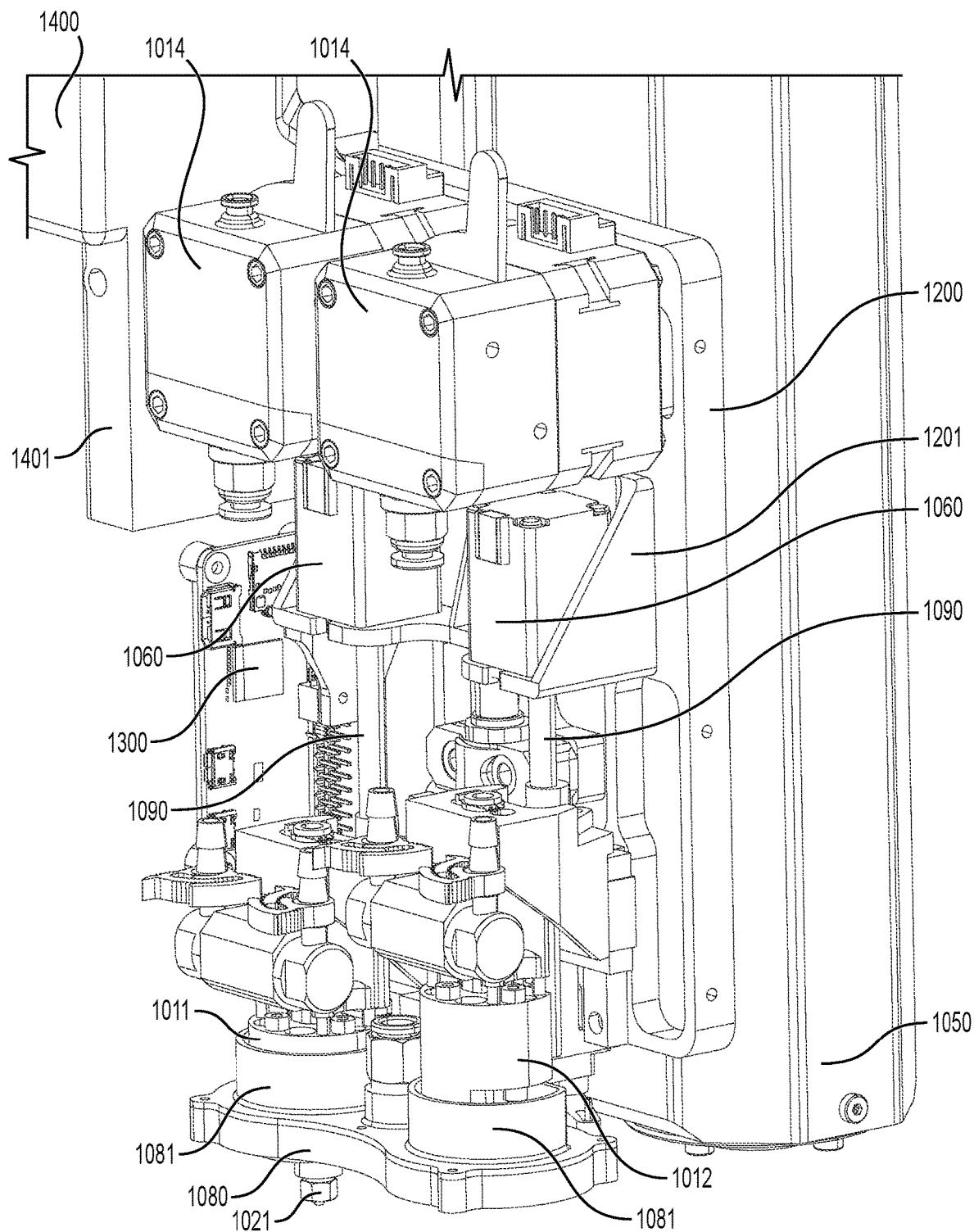
FIG. 10 is a close-up view of the plurality of printer heads of FIG. 9 with a casing removed.
Figure 12B:
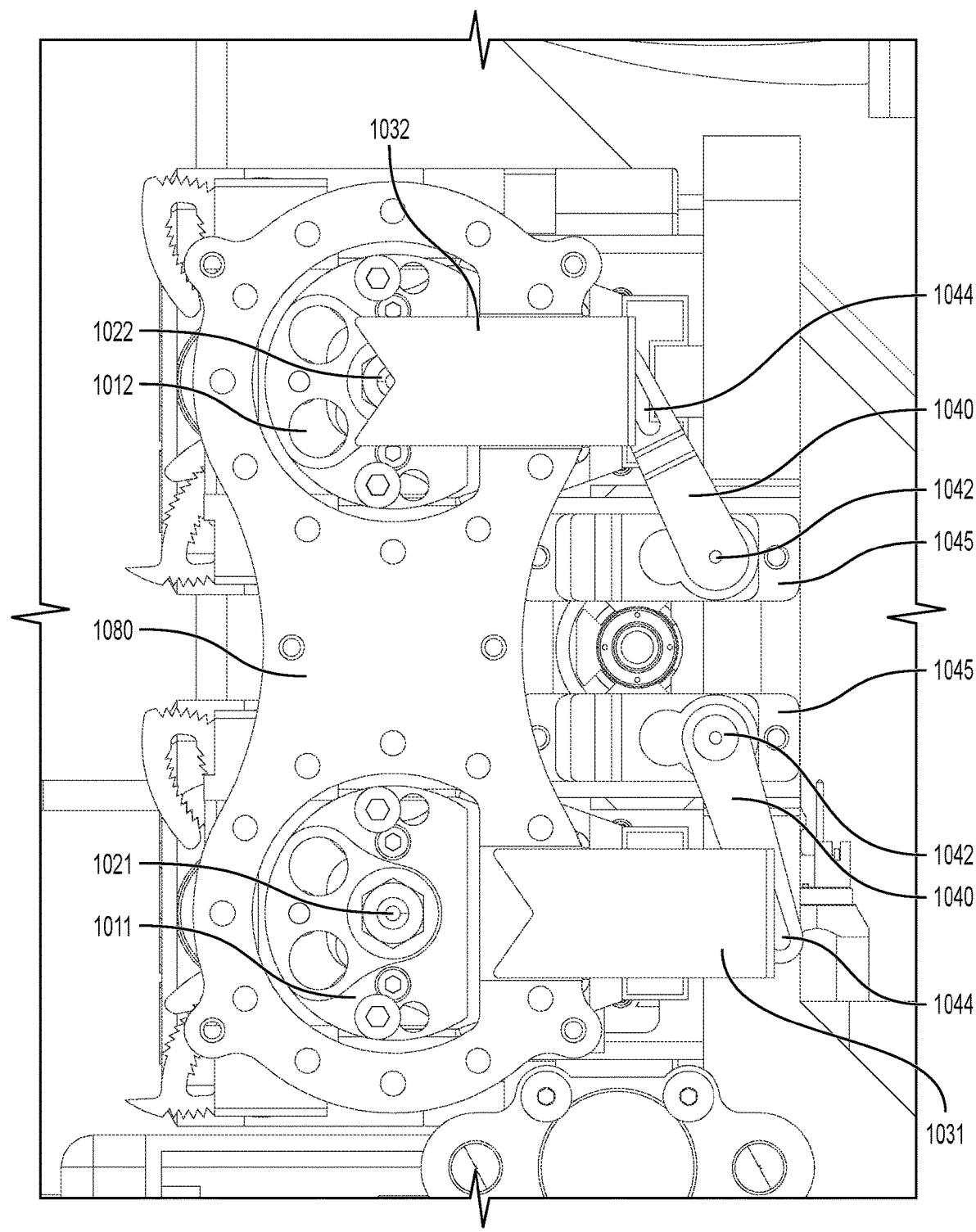

FIG. 12B provides a bottom view of the filament heads of FIG. 10.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein. Three-dimensional (3D) printing is a common form of additive manufacturing. A 3D printer prints a 3D object via particle deposition. A device on the printer, generally called the head, continuously deposits material onto a surface while moving relative to that surface. This combination of deposition and movement is used to create a layer of material in a defined shape. 3D printers often print objects in layers, with the first layer of the print being deposited directly onto a surface by the printer head. This surface is commonly called the printer bed and the object being printed is commonly referred to as a workpiece. The design of a 3D object that is to be printed is often derived from a digital file containing details of the object's shape and structure.

The material that a 3D printer uses is heated prior to deposition so that the material can be easily deposited by the printer head during printing. Print layers comprise warm material that fuse with a layer below. Once the print is complete, the workpiece cools and solidifies. Materials such as plastic are commonly used to make 3D prints because plastics can be heated relatively easily and will solidify at room temperature. However, other materials, such as metals, are also used to make 3D prints.

The bed onto which material is deposited is typically preheated to adhere deposited material onto the bed. When the printer head has finished depositing material, the workpiece and printer bed cool down. As objects and the printer bed are heated, they expand due to thermal expansion; likewise, as objects and the printer bed cool, they contract due to thermal expansion. The high temperatures used can also spread via heat transfer to nearby elements of the 3D printer, causing thermal expansion-induced deformations of those elements. This is especially problematic when the deformations offset the location of the printer bed, as this introduces a variable not accounted for in a digital file of the part to be printed. This can lead to unexpected and undesired deformations and errors in the final printed object. Moreover, the workpiece, bed, and elements of the 3D printer exposed to heat will contract due to cooling after a 3D print is completed. During cooling, the thermal expansion of the workpiece may lead to undesired deformations, and the thermal expansion of the printer bed to which the workpiece is adhered to may also deform the workpiece. Thus, it is desired to introduce a means of mitigating the effects of thermal expansion on the final product of a 3D print.

Because 3D printers may print objects using a variety of materials, 3D printer heads may be designed to work with a variety of materials or material forms. For instance, a printer could use plastic in filament form or plastic in pellet form. The form of a given material used will influence the form of the final 3D-printed product. For example, an extremely fine filament may be used to produce a high level of detail in a 3D print while a coarser form of material, such as pellets, may be deposited more quickly and in greater quantities than fine filament, leading to a shorter print time. In certain applications, a low level of detail, or low resolution, is desired in a 3D print. In other applications, fine detail, or high resolution, is desired in a 3D print. Certain materials, nozzle designs, or other factors are often more appropriate for varying levels of resolution in a 3D print. The use of a material or nozzle design that does not fit with a desired resolution can lead to issues with printing, errors in the final printed product, or a longer-than-necessary print time. These problems may occur when a printer with a single nozzle is used to perform prints that call for different resolutions; therefore, a single 3D printer capable of printing at different levels of resolution is highly desirable.

Another issue that occurs with 3D printers is commonly referred to as 'oozing' wherein unwanted print material drips from a printer head onto the print surface or workpiece, Print material accumulates in and around the print nozzle during printer usage, and material dripping from the nozzle when no material deposition is desired is considered ooze. Print material that escapes the printer head while said printer head is not being used for printing, such as residual or excess print material dripping out of a print head nozzle, material that pre-emptively escapes a printer head when a print begins, or material that hardens and sticks to the surface of the printer head may be considered ooze. Oozing may occur as a consequence of the print material pumping process, gravity, expansion or escape of liquid impurities from the print material, thermal expansion of the heated material, or a combination thereof. To circumvent this, 3D printers may retract a small amount of filament from a nozzle to limit oozing via suction. Ooze reservoirs may be used to provide a place for the printer to deposit ooze during the printing process. Cleaning stations on the printer can be used to remove ooze at intervals during a print. The printer may also place the nozzle up against a stationary surface that blocks ooze when the printer is not in use. These solutions require an extended printing process, use extra print material, or have limited effectiveness. Thus, a mechanism which efficiently prevents unwanted oozing (an "anti-ooze" mechanism or drip prevention system) of print material and/or quickly removes residual material from a nozzle during the 3D printing process is desired.

Embodiments disclosed herein are designed to address issues of the thermal expansion of components in a 3D printer. In embodiments, a 3D printer comprises an actively-heated print bed which is mounted to a support truss via a first kinematic couple. The support truss is then mounted to other surfaces on the printer via a second kinematic couple, creating a doubly kinematic-coupled print bed. Although only the bed is actively heated, heat transfer from the heated bed to the support truss may cause the support truss to undergo thermal expansion, and thus a second kinematic couple is used. The printer bed may be heated by one or a plurality of heating elements (e.g., electrically-powered resistive heating elements) such that the heat transfer may be performed quickly and uniformly across the bed.

A kinematic couple comprises one object with three mounting points fitted into three indentations of another object, with the geometry of the mounting points and the indentations resulting in six points of contact configured to constrain six degrees-of-freedom of the two objects. In a Maxwell kinematic couple, the indentations are long V-shaped grooves oriented towards a centroid of the object. An object can thermally expand in a Maxwell kinematic couple without the centroid of thermal expansion changing position. In a Kelvin kinematic couple, one object has a concave tetrahedron with a V-shaped groove and a flat plate, while the other object has three spherical surfaces that rest upon the V-shaped groove and the flat plate.

Thermal expansion of the bed and support truss will approximately occur outward from each component's geometric center relative to its coupling points. The first set of kinematic coupling units allows the centroid of expansion of the heated bed to remain constant relative to the support truss during thermal expansion. The second set of kinematic coupling units allows the centroid of expansion of the support truss to remain constant relative to the other surfaces of the 3D printer during thermal expansion. As the heated bed approaches a final temperature, it reaches a steady state of thermal expansion about its centroid of expansion at which point thermal expansion stops. A steady state temperature may not be achieved in the support truss, which is not actively heated, but its centroid of expansion can be known. In embodiments, the centroid of expansion for the heated printer bed is aligned directly above the centroid of expansion for the truss such that the bed and truss can expand at different times without moving with respect to one another. Due to the alignment of the two kinematic couples, each of which allows the bed and support truss to remain in a constant position despite thermal expansion, the centroid of the printer bed remains constant. The constant position of the bed's centroid of expansion allows the 3D printer to perform prints that compensate for the deformation of the bed that will occur during cooling, and the constant position of the bed's centroid under conditions of thermal expansion due to the two kinematic couples prevents the bed from going out of alignment during printing.

Advantages of the doubly kinematic-coupled print bed of 3D printer 100 include the ability to preheat only bed 110, which has a much smaller thermal mass compared to support truss 120. This enables a much shorter time to preheat bed 110 and consumes less energy than if both bed 110 and support truss 120 were preheated. During the 3D printing process, bed 110 undergoes thermal expansion and reaches a steady state relatively quickly (e.g., in about 20 minutes), whereas support truss 120 gradually heats up due to heat transfer from bed 110 and undergoes thermal expansion much more slowly (e.g., over 24 hours or more). The doubly kinematic-coupled print bed of 3D printer 100 is configured to account for the different expansion times between bed 110 and support truss 120 to prevent misalignment of the workpiece being printed.

In other embodiments, a 3D printer utilizes a plurality of print heads contained on a single 'master head' with at least a low-resolution and high-resolution print head combined on a single unit so that a single 3D printer can perform both low- and high-resolution prints. One of the heads may use pellets for low-resolution or large 3D prints. One of the heads may use filament for high-resolution 3D prints. Additionally, the heads may both participate in the same print, with one head printing certain elements of an object and the other head printing other elements of the object such that the heads allow for the object to be printed at any desired level of detail in an efficient manner. The heads may be deployed with linear actuators such that unused heads are moved out of the way during printing. The heads may contain protective coverings when not deployed such that residual material is prevented from oozing onto the build plate.

Further embodiments describe a multi-resolution print head that is able to print using filament and pellets in an efficient manner. By comprising multiple filament heads and one or more pellet heads on a single printer head, a 3D printer can freely print objects of multiple resolutions or even employ multiple resolutions seamlessly during a single print. Further embodiments describe an anti-ooze or drip prevention mechanism comprising retractable nozzle shields disposed on the print head. These nozzle shields may quickly extend and retract to minimize the time a filament head may drip excess print material from the tip, end, or spout of a nozzle, and they may also scrape off residual material that may be accumulated on the nozzles. Scraping may occur at a fast rate to expel ooze while also minimizing the time at which an inactive nozzle remains uncovered. These nozzle shields work in tandem with a series of linear actuators that retract the filament heads when not in use.

Finally, a 3D printer may comprise both a doubly-kinematic-coupled printer bed and a multi-resolution print head outfitted with an anti-ooze mechanism. The combination of these elements begets a versatile 3D printer that may readily print using a variety of materials without compromising on print quality consequent of deformities from thermal expansion or the use of non-ideal print resolutions.

Figure 1:
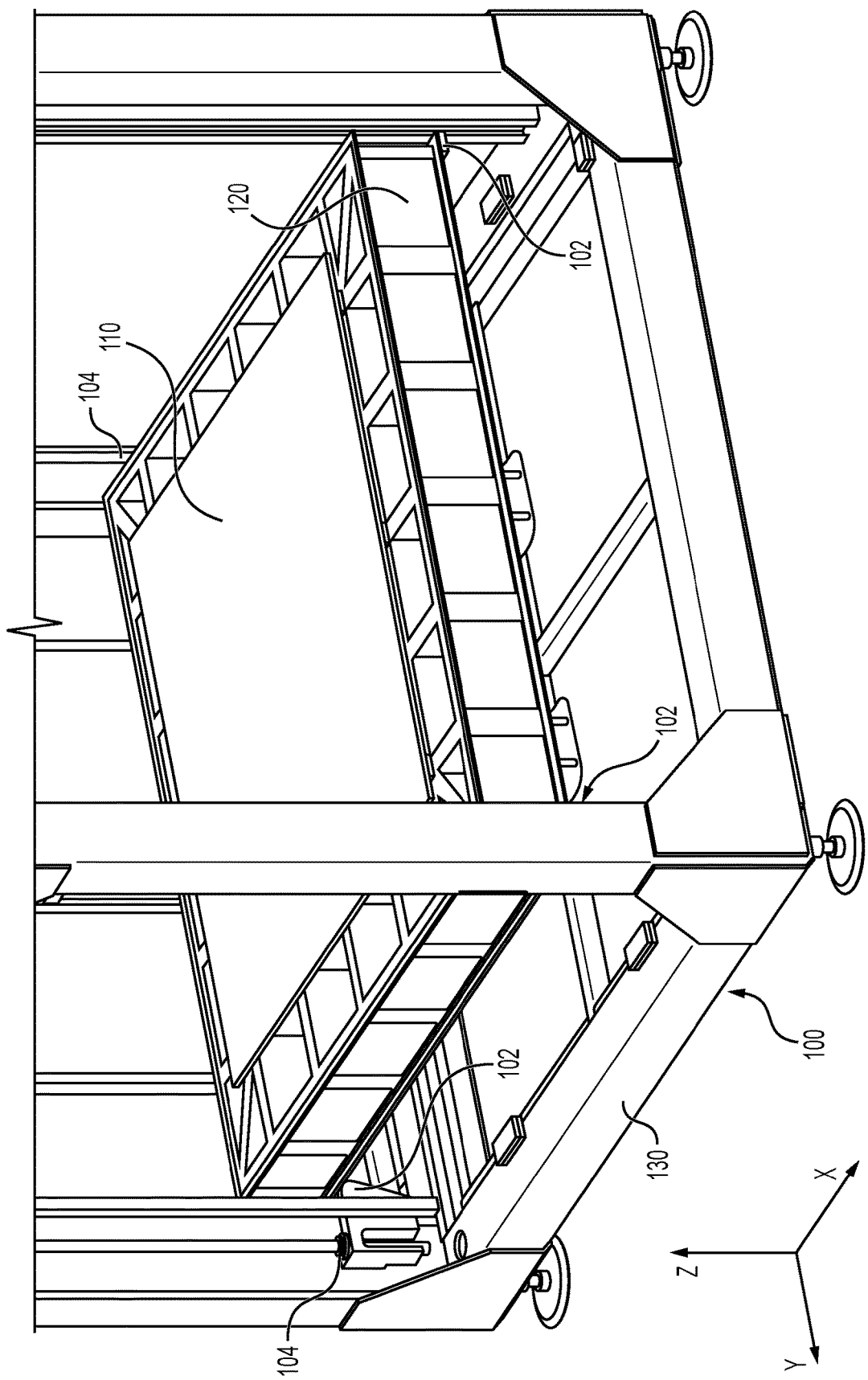
FIG. 1 shows a portion of a 3D printer with a printer bed, support truss, and frame, in an embodiment.

Referring now to FIG. 1, 3D printer 100 comprises a bed 110, a support truss 120 on which the bed 110 is mounted, support members 102 on which support truss 120 is mounted, and frame 130 onto which support members 102 are mounted. Bed 110 is mounted to support truss 120 using a kinematic coupling (e.g., a Kelvin-style kinematic coupling). Support truss 120 is mounted to support members 102 using a kinematic coupling (e.g., a Maxwell-style kinematic coupling). Support members 102 may be moved along the Z-direction via linear actuators 104. During a 3D print, a printer head may deposit material, such as plastic, onto the surface of bed 110. Bed 110 is actively heated to adhere any plastic deposited onto its surface during printing.

A kinematic coupling unit may be used to couple support truss 120 to support member 102, in some embodiments. For the mounting system to function as a kinematic coupling, three kinematic coupling units are used to couple support truss 120 to support members 102. The three kinematic coupling units are configured to form a vertex of a triangle. A mounting body is fastened or otherwise fixedly attached to support truss 120. Each kinematic coupling unit serves as one corner of a kinematic couple. Specific geometries and configurations of kinematic coupling units are discussed in FIGS. 3, 4, and 5.

In operation, as support truss 120 undergoes thermal expansion due to heat transfer from bed 110, a portion of a kinematic coupling unit moves within a mounting groove along an axis of movement. The heat transfer may result in support truss 120 and bed 110 expanding at different rates. The axis of movement for any kinematic coupling unit comprises the line from the kinematic coupling unit to the centroid of the kinematic couple. Thus, support truss 120 expands along the axes of movement for each of its three kinematic coupling units when it undergoes thermal expansion. While support truss 120 remains coupled to support member 102, no strain is induced on support member 102 by the thermal expansion of support truss 120 because the kinematic coupling unit is mobile relative to its mounting groove.

Figure 2:
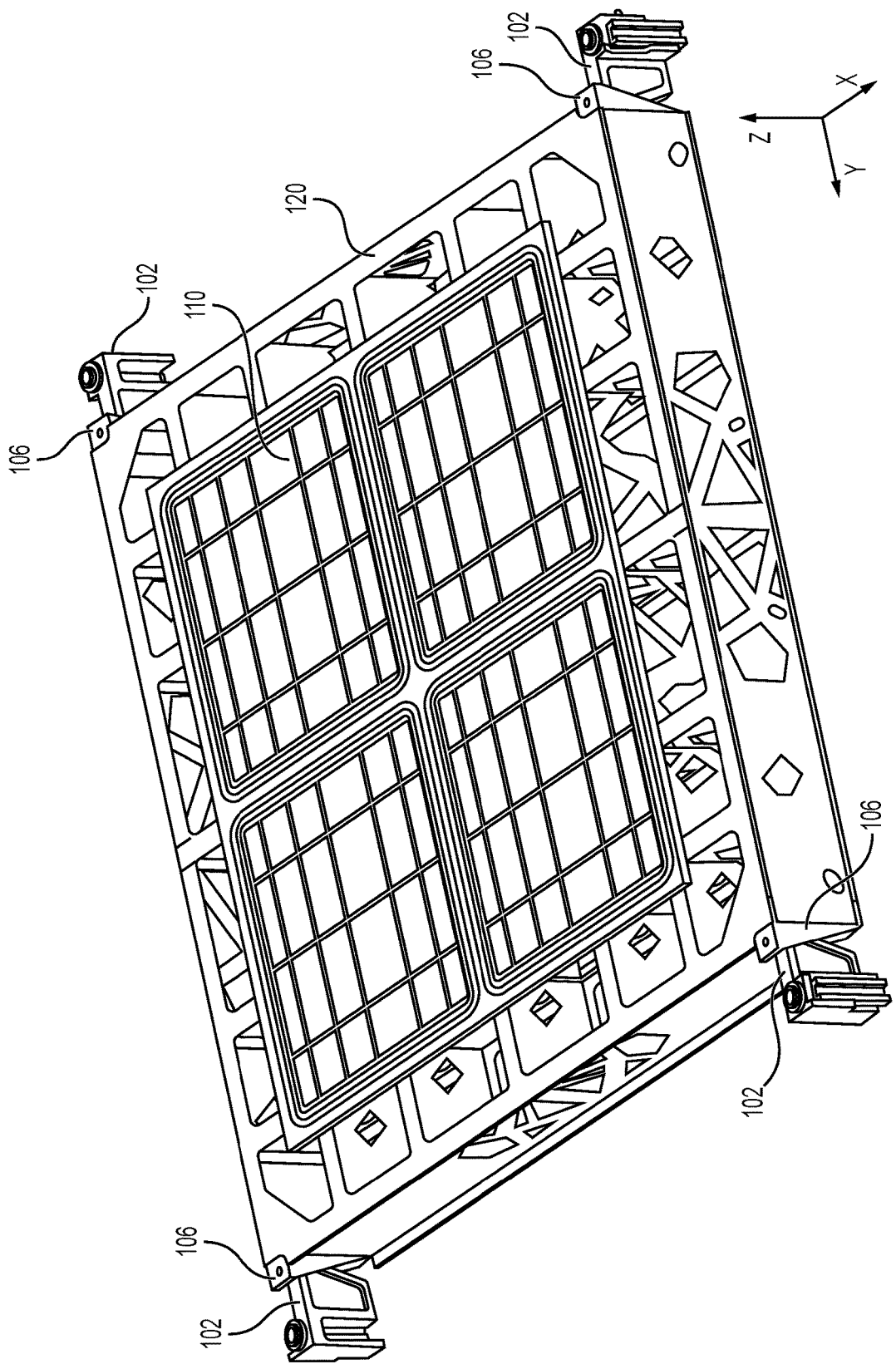
FIG. 2 depicts a support truss with an alternative kinematic coupling arrangement, in an embodiment.
Figure 3B:
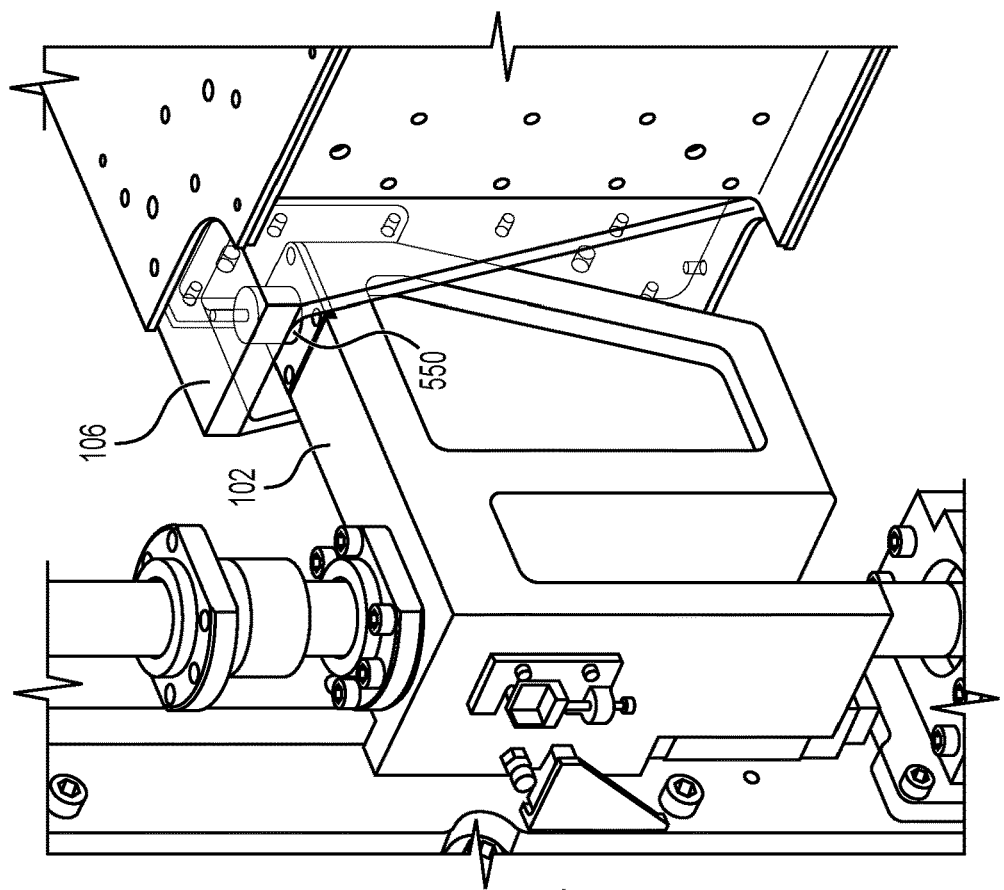
FIG. 3B shows a close-up view of another embodiment of a kinematic coupling unit between the support truss and a support member of FIG. 2.
Figure 3A:
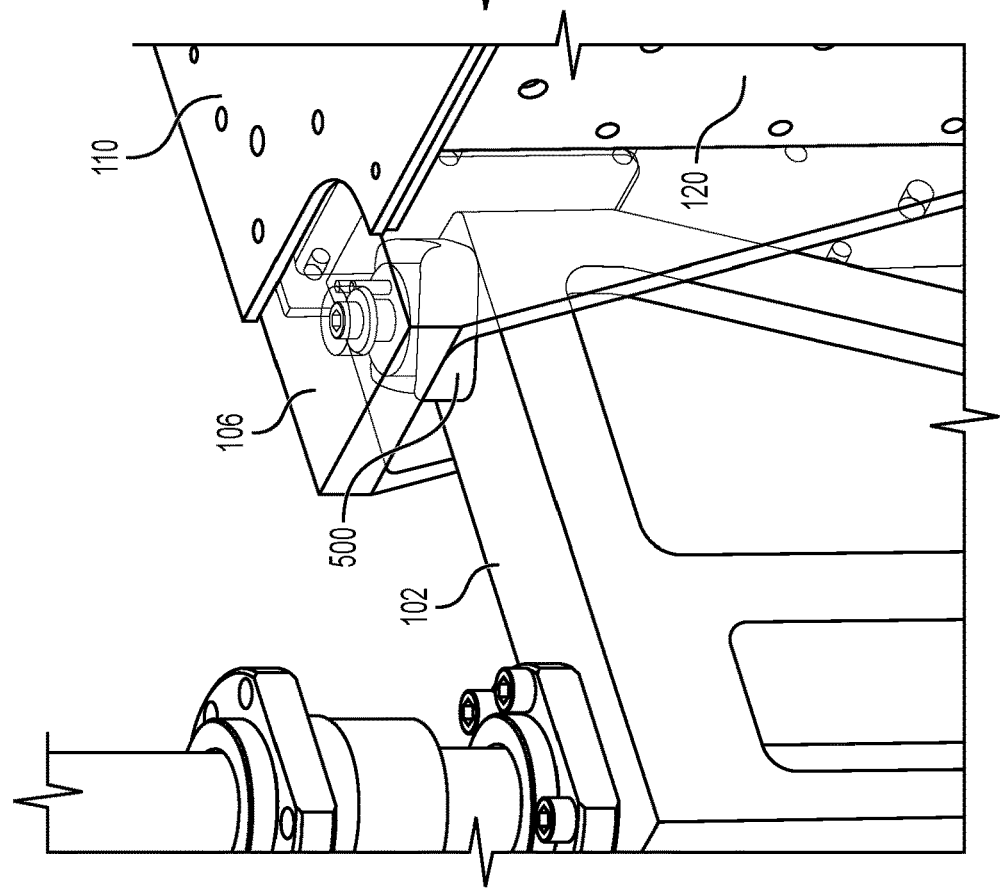
FIG. 3A shows a close-up view of an embodiment of a kinematic coupling unit between the support truss and a support member of FIG. 2.

FIG. 2 depicts support truss 120 with an alternative coupling arrangement to support members 102 compared with the FIG. 1 embodiment. As depicted in FIG. 2, support members 102 are positioned along the sides of support truss 120 as opposed to being positioned beneath support truss 120 as shown in FIG. 1. Each support member 102 couples to a receptacle 106 extending from a corner of support truss 120. Receptacle 106 may be fastened or otherwise fixed (e.g., bonded or welded) to support truss 120. In embodiments, support members 102 are oriented longitudinally in the same direction (e.g., in a "Y" direction as indicated in FIG. 2) for connecting support truss 120 with frame 130; however, some or all of support members 102 may be positioned on other sides of support truss 120 in perpendicular directions (e.g., in an "X" direction as indicated in FIG. 2), without departing from the scope hereof. FIGS. 3A and 3B show close-up views of different coupling embodiments between support members 102 and receptacle 106.

FIGS. 3A and 3B each show a close-up view of the coupling between support member 102 and receptacle 106. In both FIGS. 3A and 3B, receptacle 106 is depicted as "see-through" to enable viewing of underlying components. In the FIG. 3A view, a V-shaped kinematic coupling unit 500 is used for coupling support member 102 with receptacle 106. V-shaped kinematic coupling unit 500 comprises a V-shaped groove (see FIG. 4) oriented towards the centroid of support truss 120, which is configured to constrain movement of support truss 120 in two degrees-of-freedom (e.g., a horizontal and a vertical translation). In the FIG. 3B view, a stand 550 is used for coupling support member 102 with receptacle 106. One or more of stands 550 may be used in embodiments to prevent sagging of bed 110. A cone-shaped kinematic coupling unit 600 (see FIG. 5) may also be used to align the point of thermal expansion of the two kinematic coupling systems in the X and Y directions. Cone-shaped kinematic coupling unit 600 is configured to constrain the movement of the truss in the X-Y plane.

Figure 4:
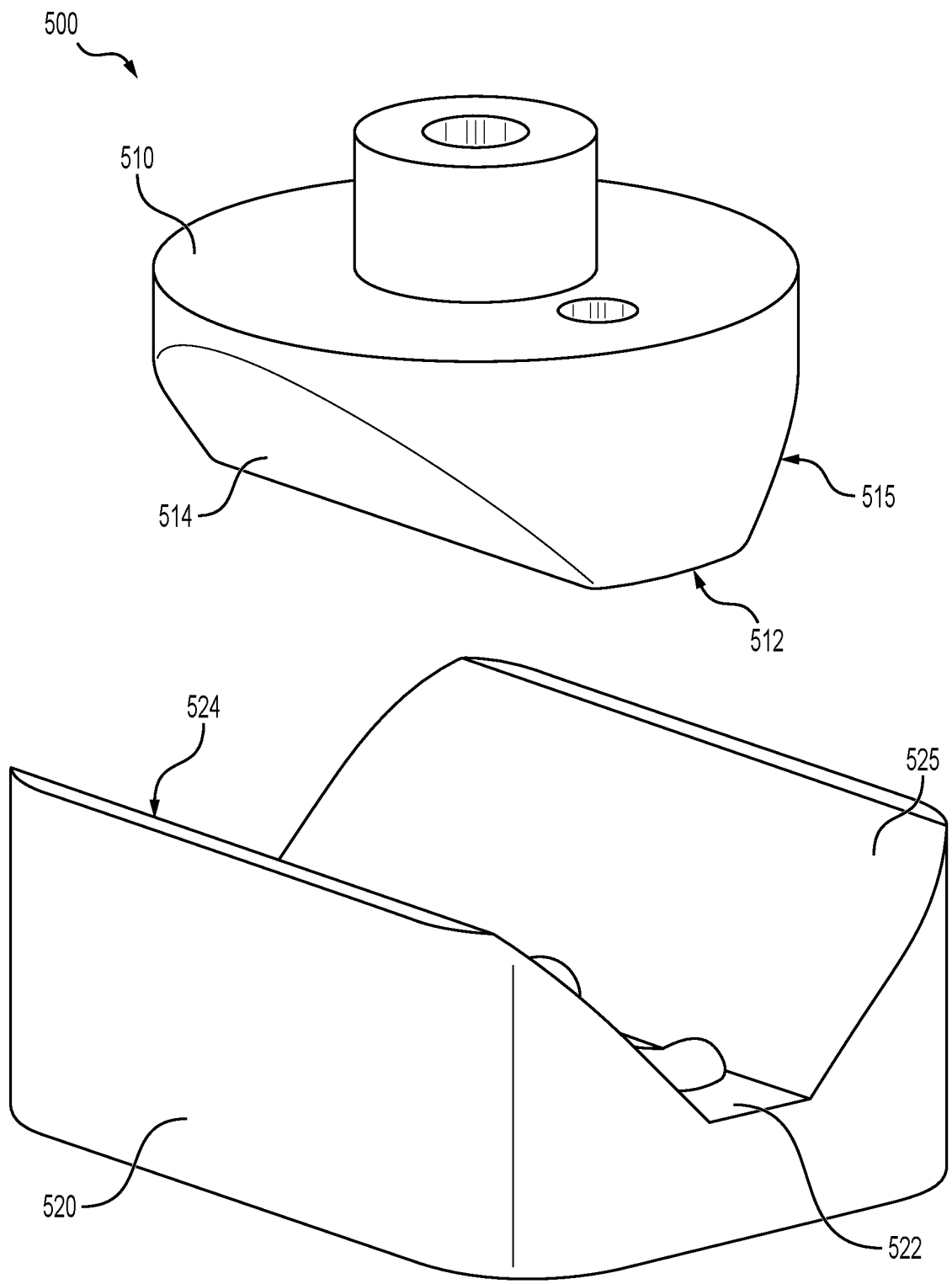
FIG. 4 is an exploded view of a V-shaped kinematic coupling unit, in an embodiment.

FIG. 4 is an exploded view of V-shaped kinematic coupling unit 500 having a receptacle 520 and an insert 510, with insert 510 being configured to sit within the receptacle 520. In embodiments, insert 510 comprises a truncated V-shaped lower portion and receptacle 520 comprises a truncated V-shaped groove. In other words, the downwards facing shape of insert 510 has a flat portion 512 between two angled sides 514, 515, and the upwards facing shape of receptacle 520 has a flat portion 522 between two angled sides 524, 525. Angled sides 514, 515 of insert 510 are configured to rest against angled sides 524, 525 of receptacle 520 with no contact between flat portions 512, 522 . . . . Angled sides 514, 515 comprise a slight convex curvature to ensure a contact patch rather than a contact plane when contacting angled sides 524, 525. As shown in the FIG. 3A embodiment, insert 510 is fastened to support truss 120 while receptacle 520 is fastened to support member 102 for providing a kinematic couple between support truss 120 and frame 130.

Figure 5:
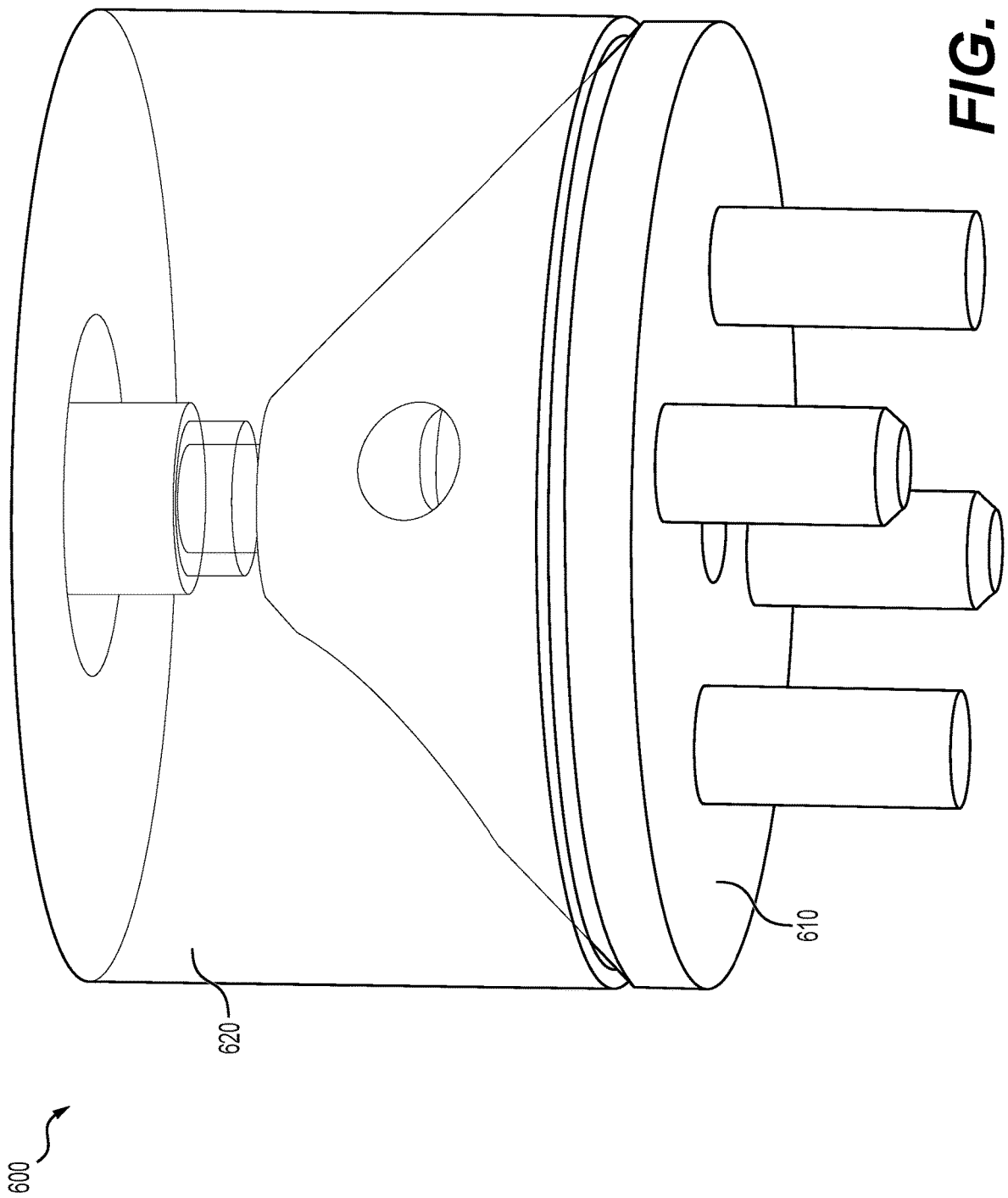
FIG. 5 is an exploded view of a cone-shaped kinematic coupling unit, in an embodiment.

FIG. 5 is an exploded view of cone-shaped kinematic coupling unit 600 having a conical protrusion 610 and a conical receptacle 620 configured to receive the conical protrusion 610. In the FIG. 5 depiction, conical receptacle 620 is rendered partially transparent to enable viewing of conical protrusion 610 inside. Conical protrusion 610 is configured to be fastened to support members 102 and conical receptacle 620 is configured to be fastened to support truss 120 for providing a kinematic couple between frame 130 and support truss 120.

Figure 6:
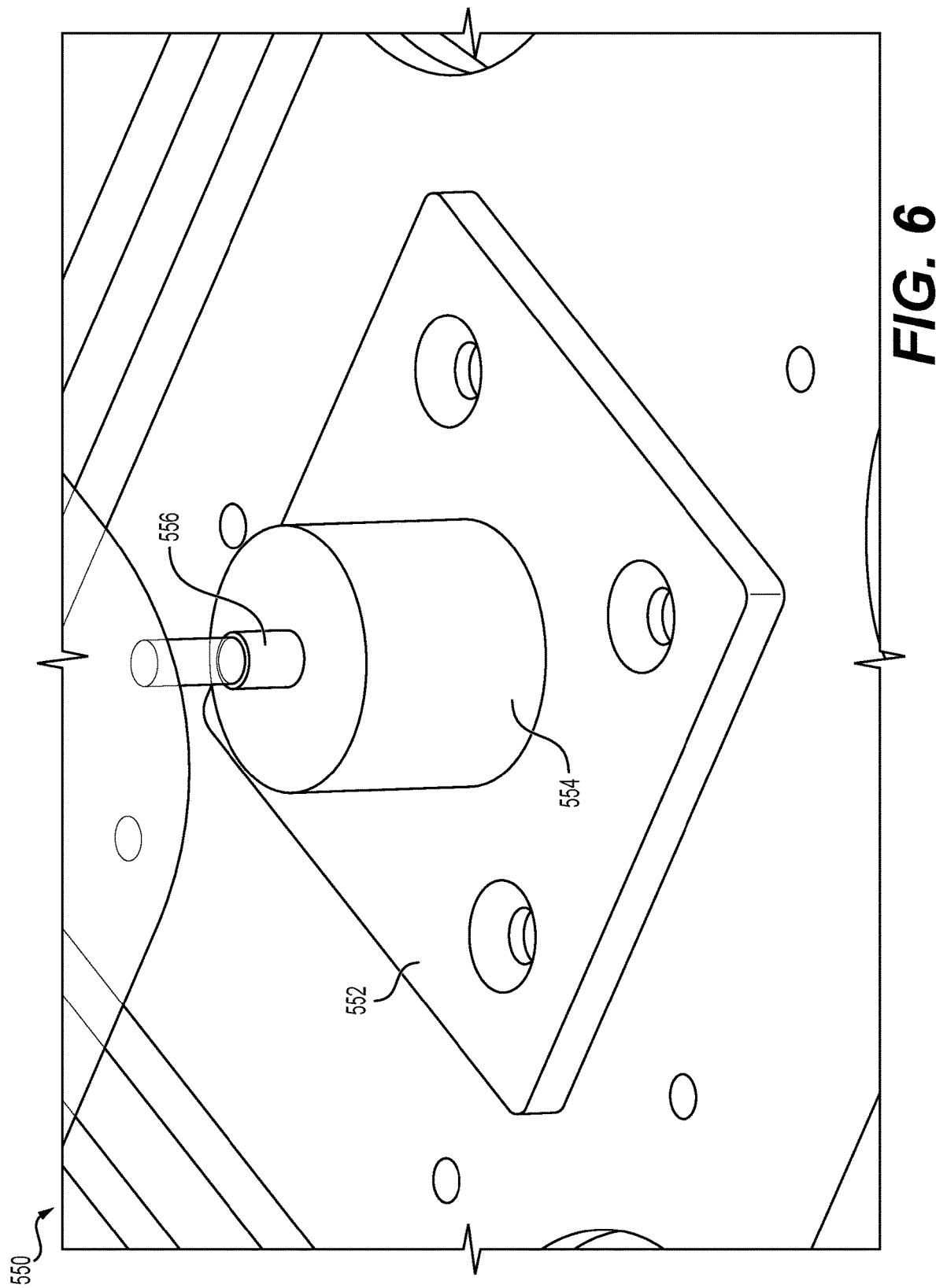
FIG. 6 shows a perspective view of a stand used with the printer bed, in an embodiment.

FIG. 6 shows a perspective view of stand 550. Stand 550 may include a base 552 configured for fastening to another component, such as bed 110 for example. Upon base 552 is disposed a hub 554 configured for resting against another component such as support truss 120, such that bed 110 may be supported by support truss 120 via one or more stands 550. A pin 556 extends from hub 554 and is configured to contact the underside of bed 110. In embodiments, stand 550 is used to prevent sagging of bed 110 since bed 110 is not a true rigid body. A plurality of stands 550 support bed 110 vertically without constraining bed 110 horizontally.

Figure 7:
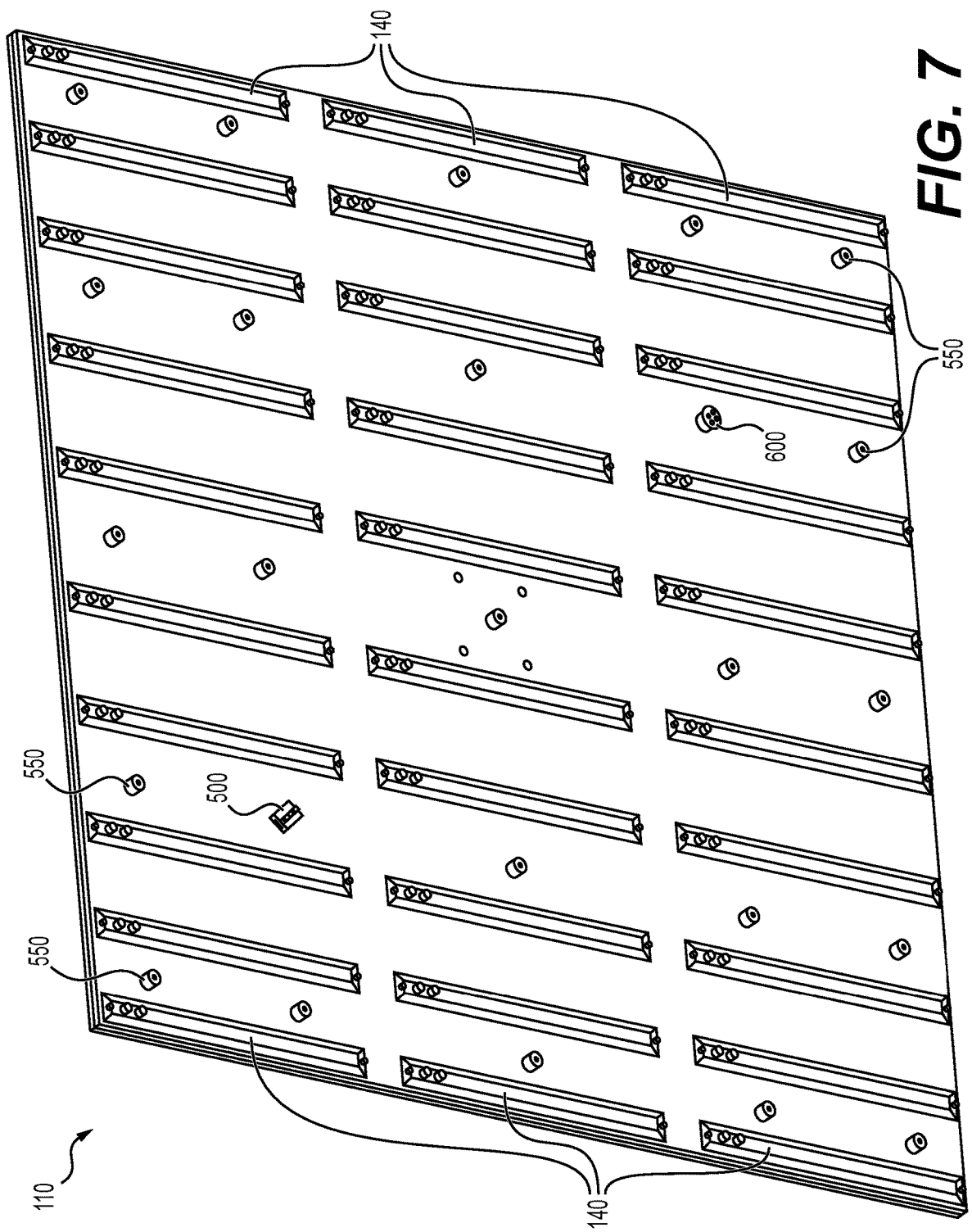
FIG. 7 shows a bottom perspective view of a printer bed, in an embodiment.

FIG. 7 shows a bottom perspective view of bed 110. A plurality of heaters 140 are fastened to an underside bed 110 for heating the print bed. A plurality of stands 550 are fastened to the underside of bed 110. Not all heaters 140 and not all stands 550 are enumerated in FIG. 7 for clarity of illustration, and greater or fewer heaters 140 and stands 550 may be fastened to the underside of bed 110 without departing from the scope hereof. In the FIG. 7 embodiment, one V-shaped kinematic coupling unit 500 and one cone-shaped kinematic coupling unit 600 are fastened to the underside of bed 110 for kinematically coupling bed 110 to support truss 120 via a Kelvin kinematic coupling. In embodiments, the cone-shaped kinematic coupling unit 600 is aligned with centroid 310 shown in FIG. 2.

Figure 8:
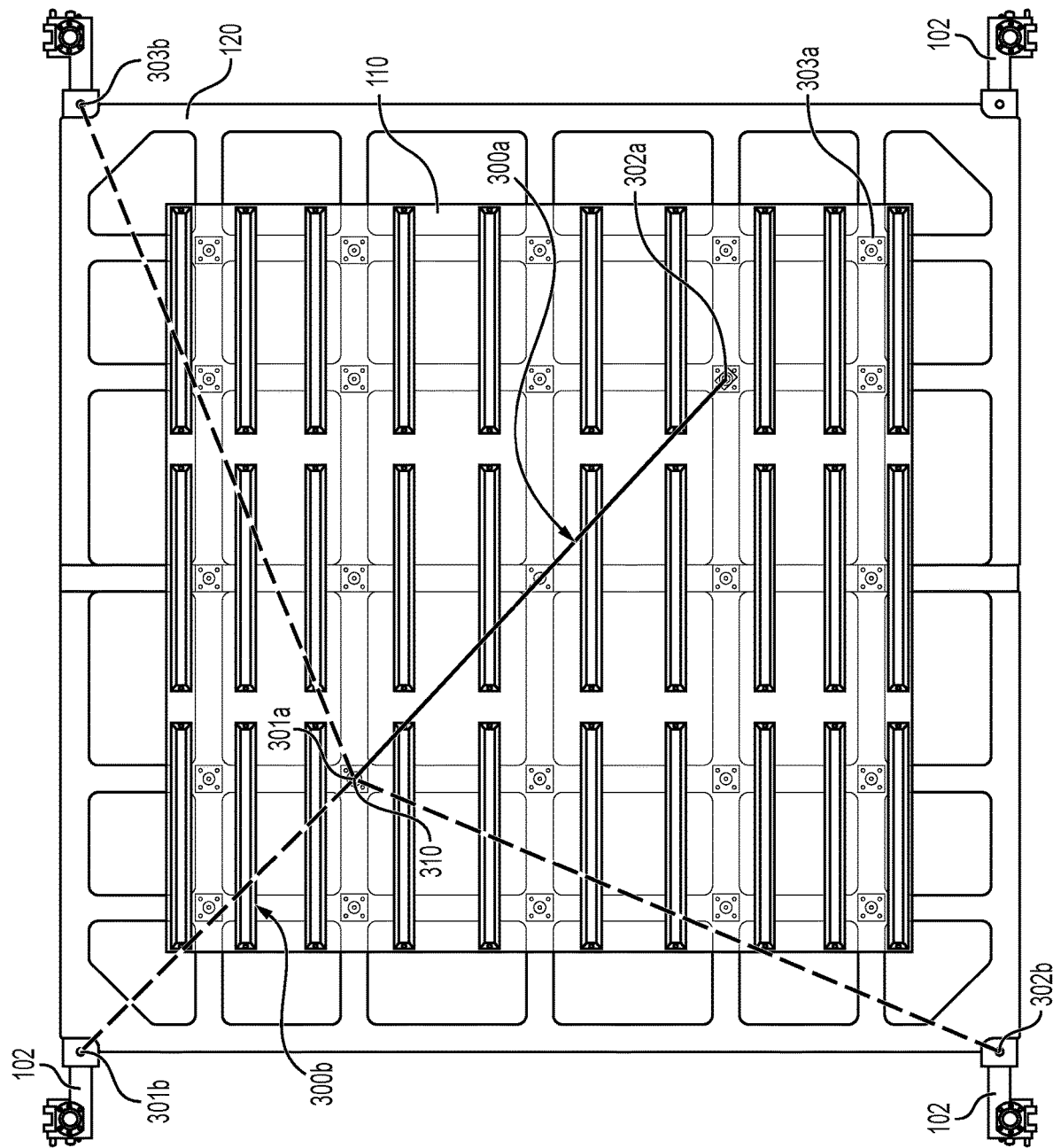
FIG. 8 is a depiction of kinematic couples between a printer bed and a support truss and between a support truss and surfaces, in an embodiment.

FIG. 8 depicts kinematic couples 300a and 300b. As depicted in FIG. 8, kinematic couple 300a is for support truss 120 and kinematic couple 300b is for bed 110. Kinematic couple 300a comprises two kinematic coupling units 301a and 302a; kinematic couple 300b comprises three kinematic coupling units 301b, 302b, and 303b. A centroid 310 overlaps between both support truss kinematic couple 300a and bed kinematic couple 300b. The lines depicted in FIG. 8 between the kinematic coupling units 301a, 302a illustrate the axes of movement in the X-Y plane for each of the kinematic coupling units 301a, 302a, respectively, of support truss 120. The lines depicted in FIG. 8 between centroid 310 and each of the kinematic coupling units 301b, 302b, 303b illustrate the axes of movement for each of the kinematic coupling units 301b, 302b, 303b, respectively, of bed 110. When bed 110 is mounted with kinematic couplings units 301a, 302a that form kinematic couple 300a, centroid 310 is used as the centroid of expansion of bed 110 under conditions of thermal expansion. When support truss 120 is mounted with kinematic couplings units 301b, 302b, 303b that form kinematic couple 300b, centroid 310 is used as the centroid of expansion of support truss 120 under conditions of thermal expansion. When bed 110 undergoes thermal expansion and expands along the axes of movement given by the position of centroid 310 and kinematic coupling units 301a, 302a, no strain is imparted on support truss 120. Likewise, when support truss 120 undergoes thermal expansion and expands along the axes of movement given by the position of centroid 310 and kinematic coupling units 301b, 302b, 303b, no strain is imparted on support members 102. Thus, when bed 110 or support truss 120 expand on their respective kinematic couples, a common geometric center is maintained relative to the kinematic coupling units, permitting thermal expansion of bed 110 or support truss 120 without altering the position of either component relative to centroid 310.

In operation, bed 110 remains positionally static in the X and Y directions using the coordinate system given in FIG. 1. Bed 110 is actively heated, and so remains at a constant temperature and thus a constant shape during printing. While bed 110 does not undergo thermal expansion, support truss 120 is not actively heated, and so will thermally expand in the X and Y directions due to transfer of heat from bed 110 and the printing process. Expansion in the Z-direction may also occur but is considered negligible due to the much smaller size of the Z dimension compared with the X-Y dimensions. In embodiments, bed 110 is placed on top of support truss 120 such that the centroid 310 of each is aligned to have the same X and Y coordinate—that is, their position only varies in the Z-direction. Because both items will thermally expand about their centroids, and because both items contain the same centroid in terms of X and Y directions, the systems share a center of expansion in terms of X and Y. Kinematic couples 30a and 30b prevent bed 110 and support truss 120 from inducing strain on one another or on support members 102, and so bed 110 remains static with respect to support truss 120 in terms of X and Y throughout the entire printing process, thereby avoiding print errors. Moreover, the constant XY-position of centroid 310 leaves only the change in the XY-dimensions of bed 110 to be compensated for when adjusting a digital print design that is to be printed into a 3D object.

Figure 9:
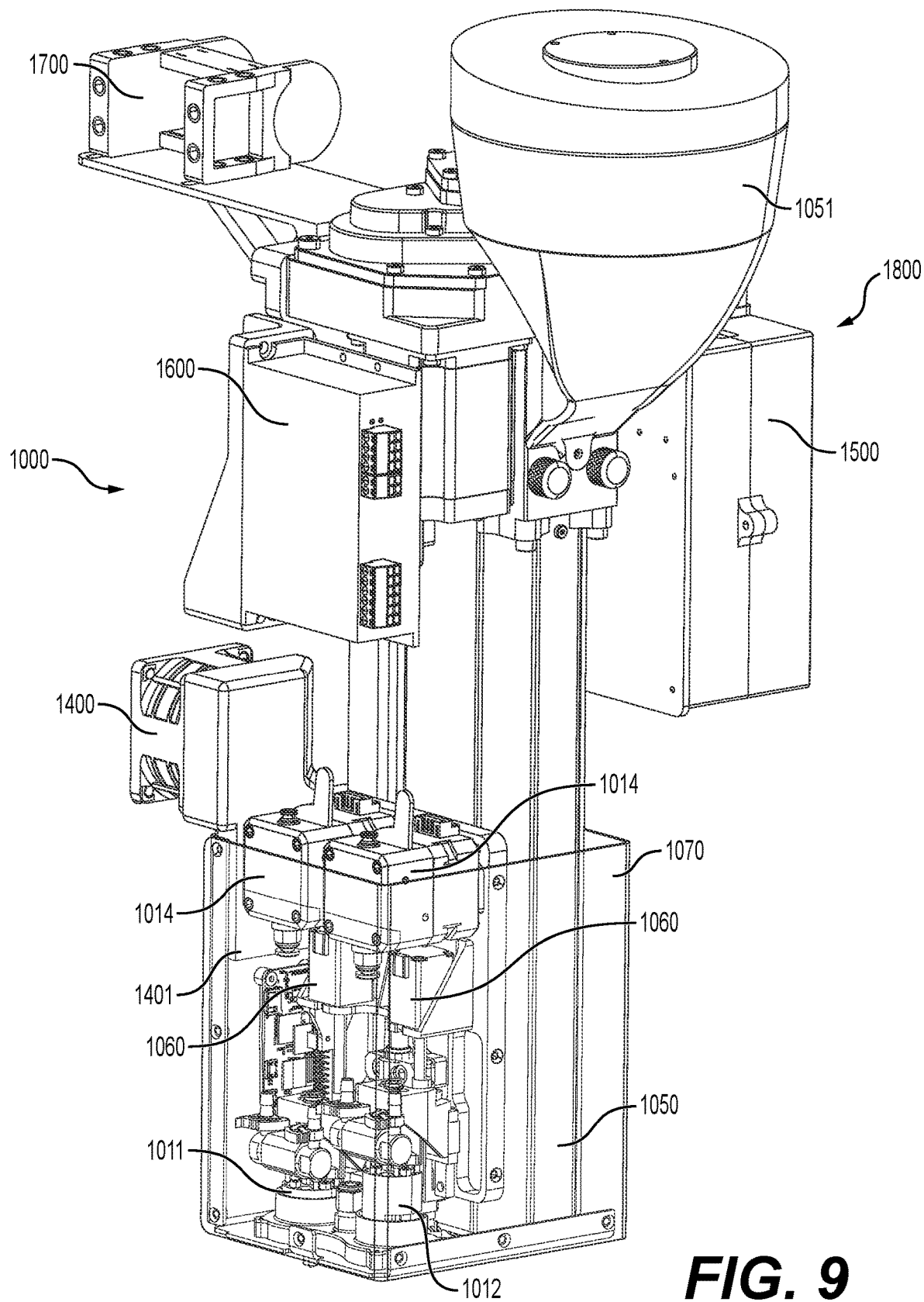
FIG. 9 is an embodiment of a main head for a 3D printer composed of multiple printer heads, in an embodiment.

FIG. 9 depicts printer head 1000 which may be part of 3D printer 100. Printer head 1000 may include one or more filament heads and one or more pellet heads. Printer head 1000 comprises two filament heads 1011, 1012 in the embodiment depicted in FIG. 9 for finely dispensing small amounts of material at a particular flowrate. Each filament head 1011, 1012 may be disposed on a linear actuator 1060 or a plurality of linear actuators 1060, and more or fewer filament heads, such as one, three, four, or more, may be present in other embodiments. Each filament head 1011, 1012, may be connected to a filament supply unit 1014 that feeds a flowrate of a filament material to a filament head via a tube (tubes not shown). Each filament supply unit 1014 may be plumbed to components present on 3D printer 100 but not present on printer head 1000, such as a filament reservoir, to provide a flowrate of a source filament material to printer head 1000. In the embodiment depicted in FIG. 9, printer head 1000 has a single pellet head 1050 for coarsely dispensing large amounts of material.

Filament heads 1011, 1012, linear actuators 1060, portions of filament supply units 1014, and a portion of pellet head 1050 are enclosed by casing 1070, which is portrayed as transparent in FIG. 9 to display components within. Casing 1070 comprises a plastic or metal protective casing in embodiments which encases sensitive components of printer head 1000. A plate (not shown) may be mounted under casing 1070 to secure to components of printer head 1000.

A pellet reservoir 1051 is mounted to pellet head 1050 via screws, bolts, or alternate forms of mounting. Pellet reservoir 1051 stores pellets of material for use during printing and feeds pellets to pellet head 1050 during the printing process.

Fan 1400 is configured to provide cooling to hardware components of printer head 1000 enclosed within casing 1070. During the printing process, filament or pellets are heated or melted such that material may be deposited from printer head 1000. Fan 1400 circulates air through duct 1401 to remove hot air from within casing 1070.

Hardware enclosures 1500 and 1600 comprise hardware such as circuit boards with processors, volatile and non-volatile computer memory, input jacks for electrical busses and power cables, cooling units, a power supply, and other components that enable software to be operated by hardware within hardware enclosures 1500 and 1600. Together, along with other components of printer head 1000, hardware enclosures 1500 and 1600 may comprise computer 1800. Computer 1800 may execute software that governs functions of printer head 1000. For instance, the software may issue commands or instructions to print using a particular printer head, such as a command to use a filament head to produce a high-resolution print or a command to use a pellet head to produce a low-resolution print. The instructions may govern the movement of the linear actuator to raise the print head into a retracted position or lower the print head into a deployed position, as further discussed in FIGS. 11 and 12. This software may be installed in non-volatile memory on printer head 1000, such as a hard disk or solid-state drive, or may be installed elsewhere on 3D printer 100.

Furthermore, mounting bracket 1700 is disposed atop pellet head 1050 using fasteners such as screws or bolts, but other fastening means such as welding may be used to attach mounting bracket 1700 to printer head 1000. Mounting bracket 1700 allows printer head 1000 to be configured in a position above bed 110 such that printer head 1000 may move relative to bed 110 during printing. An example positioning system may comprise a first rail or rails along which mounting bracket 1700 may travel in a lateral direction. The first rail or rails may further be configured to slide along a second set of rails normal to the orientation of the first set of rails, such that printer head 1000 may be moved laterally along the two directions given by the rails. For instance, a first rail may lie parallel to the X-direction shown in FIG. 1 while the second rail or rails may lie parallel to the Y-direction shown in FIG. 1, thus permitting printer head 1000 to be repositioned in the XY-plane relative to bed 110 with a range of motion that allows printer head 1000 to deposit any resolution of material at any point on the top surface of bed 110. An alternate positioning system may be used, such as a robotic arm disposed on 3D printer 100 and configured to move head 1000 in at least the XY-plane, allows printer head 1000 to deposit material at any position on bed 110. Linear actuators 104 are configured to move bed 110 and support truss 120 in the Z-direction (as seen in FIG. 1) to reduce the vertical distance between head 1000 and bed 110.

FIG. 10 contains a close-up view of printer head 1000. Each filament head 1011, 1012 is mounted to printer head 1000 via a rail 1090 which extends from a linear actuator 1060. In embodiments, linear actuator 1060 comprises a stepper motor mechanically linked to a lead screw that may drive rail 1090. In other embodiments linear actuator 1060 may comprise an electromechanical actuator, a motor, or other device capable of raising or lowering filament head 1011, 1012 when powered. Filament heads 1011, 1012 may travel along or a rail 1090, may be fixed to rail 1090 such that filament heads 1011 1012 are moved when a rail 1090 moves, may be raised or lowered via rotation of a screw between a rail 1090 and filament head 1011, 1012, or may otherwise be mechanically linked to linear actuator 1060 such that linear actuator 1060 may move filament head 1011, 1012 in a linear fashion when linear actuator 1060 is activated. Filament head 1011 is shown in a deployed position such that filament head 1011 may deposit filament to a printer bed (such as bed 110) whereas filament head 1012 is in a retracted position such that filament head 1012 may not deposit filament.

Alignment member 1080 confines the movement of filament heads 1011, 1012 such that a given filament head 1011, 1012 may only travel in a linear direction corresponding to the orientation of linear actuator 1060 and rail 1090, thereby preventing filament heads 1011, 1012 from becoming misaligned from a common linear direction shared with rail 1090. In embodiments, alignment member 1080 comprises sleeves 1081 such that sleeves 1081 conform to the shape of filament heads 1011, 1012; as seen in FIG. 10, sleeves 1081 are cylindrical to house cylindrical filament heads 1011, 1012. Alignment member 1080 may be mounted to pellet head 1050, to casing 1070, or to a baseplate 1200 or clip 1201 via screws, bolts, glue, welds, or other means.

Each filament head 1010 and linear actuator 1060 may be mounted to baseplate 1200 or mounted to features of baseplate 1200 such as clip 1201. Baseplate 1200 comprises a metal plate with features such as indents, extrusions, and welded fittings suited to support, house, mount, or attach components to printer head 1000. Clip 1201 is an embodiment feature shaped to house a plurality of linear actuators 1060. Filament supply units 1014 and duct 1401 may be mounted to baseplate 1200. In embodiments, baseplate 1200 is disposed on pellet head 1050 via screw, bolts, glue or other mounting means.

Printer head 1000 may also comprise a circuit board 1300 mounted to baseplate 1200 or pellet head 1050 via similar means. Computer 1800 may comprise circuit board 1300. Circuit board 1300 may contain a processor, computer memory, and electrical bussing such that software installed in memory of circuit board 1300 may execute instructions to perform the operations of printer head 1000, such as engaging linear actuators 1060 to deploy or retract a given filament head 1011, 1012 or depositing filament from a filament head 1010. For instance, electrical signals sent by circuit board 1300 may actuate a linear actuator 1060. Circuit board 1300 may also be electrically bussed to hardware within hardware enclosures 1500 or 1600.

Figure 11:
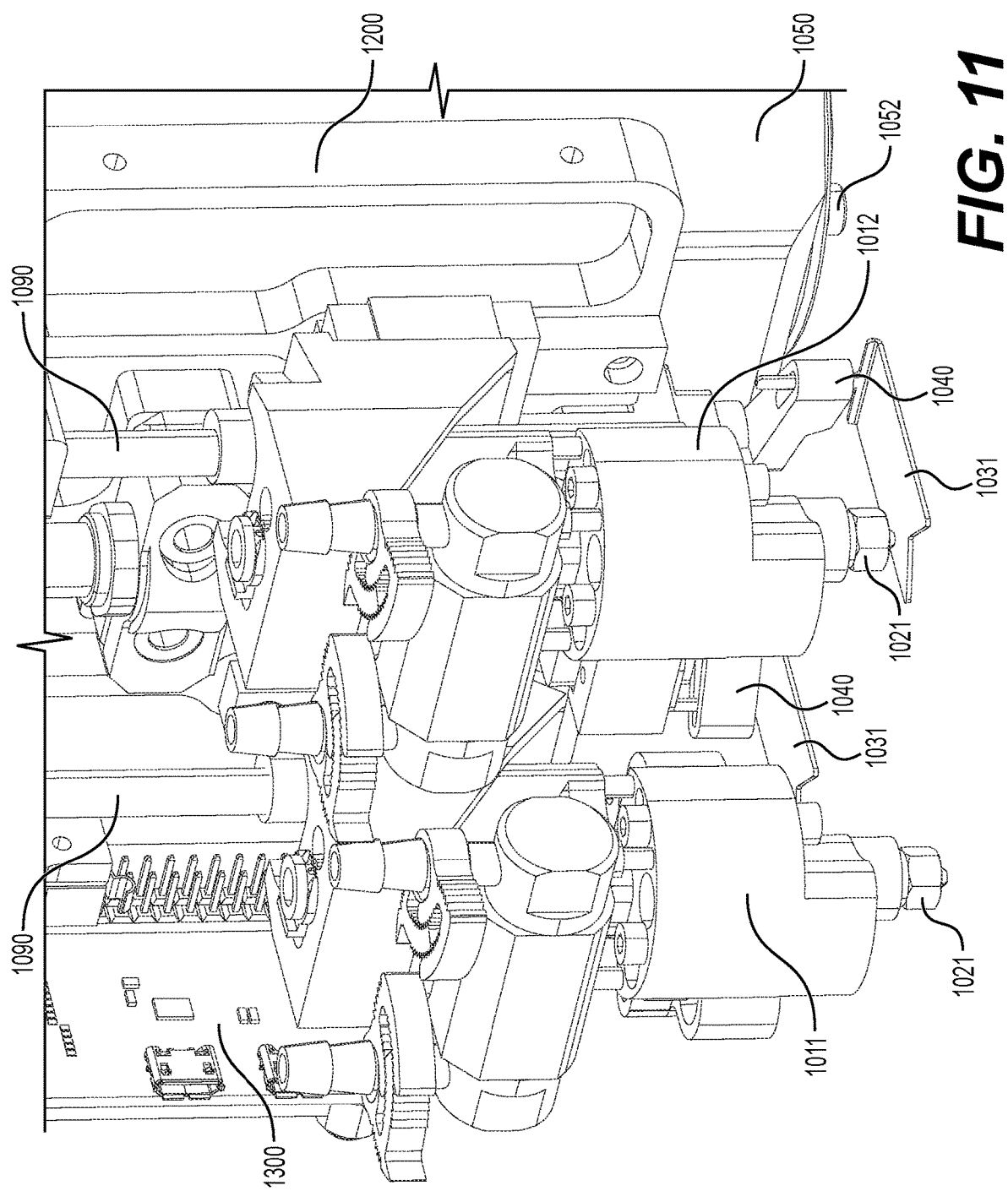
FIG. 11 is a close-up view of the filament heads of FIG. 10.

In. FIG. 11, printer head 1000 is portrayed without casing 1070 and without alignment member 1080 to give a clear image of filament heads 1011, 1012. During the printing process, a filament head 1011, 1012 may expel a flowrate of filament from a nozzle 1021, 1022. Specifically, filament departs the nozzle from the tip, spout, or end of any nozzle 1021, 1022. When a filament head (e.g., filament head 1011) is in a deployed position for printing, a protective member 1031 is positioned out of the way of nozzle 1021, allowing filament to be expelled from nozzle 1021. When a filament head (e.g., filament head 1012) is not deployed, a protective member 1032 is positioned in the way of nozzle 1022 to inhibit the escape of filament from nozzle 1022. Protective member 1032 is positioned to contact the tip of nozzle 1022 such that protective member 1032 physically obstructs ooze from escaping nozzle 1022. Thus, print material may not exit nozzle 1022 when filament head 1012 is in the retracted position. Similarly, if filament head 1011 was in the retracted position, protective member 1031 would contact the end of nozzle 1021 to prevent oozing from nozzle 1021. Each filament head 1011, 1012 may be deployed or retracted via the actuation of a linear actuator 1060, which moves filament head 1011, 1012 up and down.

Protective members 1031, 1032 comprise plastic or metal plates that may be smoothed to facilitate movement when in contact with other components in a mechanical system. Each protective member 1031, 1032, may comprise a geometry suited to scraping material from the tip of a nozzle 1021, 1022, such as a V-shaped groove. A vertex at the middle of the V-shaped groove may be configured to contact the tip of nozzle 1021, 1022 at the vertex of the groove such that ooze is driven to the sides of, or collected on top of, the protective member 1031, 1032. Ooze collected on top of the protective member 1031, 1032 may be prevented from dripping due to gravity.

In FIGS. 12A and 12B, printer head 1000 is portrayed with alignment member 1080 and without casing 1070 in a back view and bottom view respectively. For each filament head, a biasing member 1040 is mechanically linked to a shaft 1041 driven by a rotary servo 1045. Rotary servo 1045 is a motor, such as an electric motor, that rotates shaft 1041 in a clockwise or counterclockwise direction when powered. Rotary servo 1045 may be disposed on baseplate 1200 or a feature of baseplate 1200, and a plurality of rotary servos 1045 may be present such that each filament head on printer head 1000 has a corresponding rotary servo 1045.

When a filament head (e.g., filament head 1011 in FIG. 11) is deployed, rotary servo 1045 activates and rotates shaft 1041. Shaft 1041 sits within a receptacle 1042 of biasing member 1040 such that the rotation of shaft 1041 drives a rotation of biasing member 1040 relative to receptacle 1042. The mechanical linkage between any biasing member 1040 and any protective member 1031, 1032 may be configured to cause a translation of a protective member 1031, 1032 in a linear direction when biasing member 1040 rotates. For instance, a foot 1043 of protective member 1031 may be free to slide within an indent 1044 of biasing member 1040, such that protective member 1031 may translate when biasing member 1040 rotates and imparts a force upon foot 1043. Thus, when a filament head (e.g., filament head 1012) is retracted, biasing member 1040 rotates as rotary servo 1045 drives shaft 1041, thereby translating protective member 1032 into a position that covers nozzle 1022. In a similar fashion, rotary servo 1045 may rotate biasing member 1040 in the opposite direction such that protective member 1032 is repositioned to no longer cover nozzle 1022. When protective member 1032 covers nozzle 1022, leftover filament in nozzle 1022 will be obstructed by protective member 1032, thereby preventing oozing from nozzle 1022.

A protective member with respective biasing member 1040 and rotary servo 1045 may be disposed for each one of a plurality of filament heads disposed on printer head 1000, such that each nozzle may be obstructed by a protective member to prevent oozing when a filament head is in the retracted position. The mechanical system driving a given protective member may be identical to the system previously discussed for protective member 1032 and nozzle 1022.

Protective member 1031, 1032 may also function as a "scraper" such that protective member 1031, 1032 removes residual filament from a nozzle 1021, 1022. In embodiments, protective members 1031, 1032 are disposed to strongly contact nozzles 1021, 1022 when filament heads 1011, 1012 are in the retracted position. Thus, when a linear actuator 1060 returns a filament head 1011, 1012 to the retracted position, rotary servo 1045 will activate and protective members 1031, 1032 will contact any residual material that has accumulated on nozzles 1021, 1022. Rotary servos 1045 may be configured to move protective members 1031, 1032 at such a rate that any residual material is forcibly expelled from the tip of nozzle 1021, 1022 when protective member 1031, 1032 contacts nozzles 1021, 1022, thereby scraping off any residual material. A fast rate may be defined by the speed at which a linear actuator 1060 retracts a filament head 1011, 1012.

When a filament head 1011, 1012 is deployed, protective members 1031, 1032 may be repositioned by rotary servo 1045 before linear actuator 1060 is powered to lower filament head 1011, 1012. Similarly, when a filament head 1011, 1012 is deployed, protective members 1031, 1032 may be repositioned by rotary servo 1045 after linear actuator 1060 raises filament head 1011. Given that protective members 1031, 1032 are put into direct physical contact with nozzles 1021, 1022 respectively when a filament head 1011, 1012, is in the retracted position, protective members 1031, 1032 are moved before lowering nozzles 1021, 1022 to prevent damage to all components involved. A defined deployment procedure also prevents protective members 1031, 1032 from obstructing the deployment of filament heads 1011, 1012. Operating linear actuator 1060 and rotary servo 1045 in a desired order may be mediated by a mechanical linkage between linear actuator 1060 and rotary servo 1045 or may be mediated by software installed in a memory of printer head 1000, such as in computer 1800.

Particular methods for performing multi-resolution 3D prints or for performing a plurality of 3D prints at different resolutions may be employed by software stored in a non-volatile memory of computer 1800 or 3D printer 100, wherein the software may access a set of instructions (such as a CAD file or 3D model) for performing a 3D print. To achieve a multi-resolution print, software installed in a memory of printer head 1000 may selectively deploy or retract a filament head 1011, 1012 such that a maximum of one filament head may be deployed at a time to prevent dripping from an uncovered filament head. Similarly, neither of filament heads 1011, 1012 may be deployed while pellet head 1050 is depositing material to prevent oozing from both filament heads 1011, 1012, or any additional filament heads present on printer head 1000. By depositing material from both pellet head 1050 and at least one of filament heads 1011, 1012 during printing, printer 100 is able to achieve a multi-resolution print where high-resolution portions of the print comprise a finer level of detail than low-resolution portions of the print.

A number of processes may be carried out to expedite a print. For instance, a filament head 1011, 1012 may be deployed while another filament head 1011, 1012 is retracted, to reduce the time taken to perform a print requiring filament from more than one filament head. Additionally, as previously mentioned, protective members 1031, 1032 may function as "scrapers" during a print when a filament head 1011, 1012 is retracted such that ooze may be removed from either filament head 1011, 1012 while the printing process continues: ooze may be scraped from a filament head 1011, 1012 while another filament head 1011, 1012 is being deployed or is depositing filament.

In embodiments, a printer may be outfitted with a printer head featuring an anti-ooze or anti-drip mechanism, as demonstrated in FIG. 10, and with a doubly kinematic-coupled printer bed, such as the printer bed demonstrated in FIG. 2. Ostensibly, both the printer head and the printer bed would be disposed on a frame such that the printer head may readily deposit material onto the printer bed and such that the printer bed may remain level. The combined system featuring both the discussed printer head and the discussed printer bed allows for printer wherein the design of the printer minimizes the chances of introducing deformations to any final products regardless of the filament or print resolution used for that print.

A 3D print as performed by an embodiment 3D printer may comprise the steps of heating the printer bed, depositing a flowrate of material onto the printer bed from the pellet head, deploying a filament head via a linear actuator then depositing material from set filament head, retracting said filament head, then deploying a second filament head and depositing a flowrate of material from that filament head onto the printer bed. A filament head 1011, 1012 may be used to create a fine pattern or a high-resolution print while a pellet head 1050 may be used to print a coarse pattern or a low-resolution print. When not deployed, each filament head is guarded by a protective member to prevent ooze from being deposited onto the printer bed; when deployed, either filament head is not blocked from depositing material by any protective member. Linear actuators on the frame, such as linear actuators 104 shown in FIG. 1, are used to move the printer bed vertically during the printing process.

The filament heads 1011, 1012 and pellet head 1050 may be used to deposit a flowrate of material any number of times in any order during the printing process. Some heads may not be used at all, such as if a print is performed at only a high resolution or only a low resolution. At the end of the printing process, the heating units on the printer bed are turned off, allowing a manufactured item to cool. Given a monitored and controlled thermal expansion of the printer bed as allowed by a kinematic coupling system, deformations of the final print in the XY-plane due to thermal expansion are theoretically minimized.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by a Letters Patent includes the following:

1. A thermal expansion compensation system, comprising:
   a first component having a first kinematic couple;
   a second component having a second kinematic couple; and
   a centroid, wherein the first kinematic couple is configured to provide thermal expansion of the first component at a first rate about the centroid, and
      wherein the second kinematic couple is configured to provide thermal expansion of the second component at a second rate about the centroid, such that said first and second components remain positionally static relative to one another about the centroid wherein the first kinematic couple comprises two kinematic coupling units;
      wherein the first component is a heated printer bed and the second component is a support truss configured to support the heated printer bed.

2. The thermal expansion compensation system of claim 1, wherein the centroid comprises a common position in two dimensions between the first kinematic couple and the second kinematic couple.

3. The thermal expansion compensation system of claim 1, wherein the second kinematic couple comprises three kinematic coupling units.

4. The thermal expansion compensation system of claim 1, comprising a frame, wherein the second kinematic couple couples the support truss to the frame.

5. The thermal expansion compensation system of claim 4, comprising a plurality of stands disposed on the support truss to support the heated printer bed, wherein at least one stand of the plurality comprises a kinematic coupling unit configured to enable thermal expansion of the heated printer bed independently from the support truss.

* * * * *